United States Patent
Frenger et al.

(10) Patent No.: US 9,155,065 B2
(45) Date of Patent: Oct. 6, 2015

(54) METHODS AND ARRANGEMENTS FOR TRANSMISSION OF PAGING IN A COMMUNICATION SYSTEM

(75) Inventors: Pål Frenger, Linköping (SE); Erik Eriksson, Linköping (SE); Fredrik Gunnarsson, Linköping (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 243 days.

(21) Appl. No.: 13/825,053

(22) PCT Filed: Sep. 22, 2010

(86) PCT No.: PCT/SE2010/000228
§ 371 (c)(1),
(2), (4) Date: Mar. 19, 2013

(87) PCT Pub. No.: WO2012/039650
PCT Pub. Date: Mar. 29, 2012

(65) Prior Publication Data
US 2013/0182677 A1    Jul. 18, 2013

(51) Int. Cl.
*H04W 68/00* (2009.01)
*H04W 68/02* (2009.01)

(52) U.S. Cl.
CPC ............ *H04W 68/005* (2013.01); *H04W 68/02* (2013.01)

(58) Field of Classification Search
CPC .................................................. H04W 68/005
See application file for complete search history.

(56) References Cited

U.S. PATENT DOCUMENTS

| | | | |
|---|---|---|---|
| 7,398,091 B2 * | 7/2008 | Chen | 455/454 |
| 7,684,357 B2 * | 3/2010 | Jokinen et al. | 370/311 |
| 8,335,183 B2 * | 12/2012 | Nguyen | 370/329 |
| 8,543,138 B2 * | 9/2013 | Teauge et al. | 455/458 |
| 8,744,496 B2 * | 6/2014 | Cave et al. | 455/458 |

(Continued)

FOREIGN PATENT DOCUMENTS

| | | |
|---|---|---|
| WO | 2007148932 A1 | 12/2007 |
| WO | 2012039651 A1 | 3/2012 |
| WO | 2012039652 A1 | 3/2012 |

OTHER PUBLICATIONS

Tang, H. "An Adaptive Paging Area Selection Scheme." Third International Conference on Communications and Netoworking in China, Aug. 25-27, 2008, pp. 1106-1110, Hangzhou, China.

(Continued)

*Primary Examiner* — Andrew Lai
*Assistant Examiner* — Hoyet H Andrews
(74) *Attorney, Agent, or Firm* — Murphy, Bilak & Homiller, PLLC

(57) ABSTRACT

The present invention relates a radio network node (204, 304) and methods therein for coordinating paging commands. A method comprises receiving paging command information related to a UE from a paging controller node, where the paging command information comprises a list of radio network nodes. Within method a radio network node then obtains information about available physical radio resources (S-218, S-326, 406, 506) of a second radio network node (206, 306), for paging, and determines physical radio resources (S-220, S-328, 408, 508) to be used for transmitting a paging command for the UE, and transmits information related to a paging command (S-222, S-330, 410, 510 for the UE, to said second radio network node (206, 306).

15 Claims, 5 Drawing Sheets

(56) References Cited

U.S. PATENT DOCUMENTS

| | | | |
|---|---|---|---|
| 8,761,813 B2* | 6/2014 | Gao | 455/458 |
| 8,811,252 B2* | 8/2014 | Maeda et al. | 370/312 |
| 2008/0090593 A1 | 4/2008 | Jen | |
| 2009/0003285 A1 | 1/2009 | Mohanty et al. | |
| 2010/0159960 A1* | 6/2010 | Chou et al. | 455/458 |

OTHER PUBLICATIONS

3rd Generation Partnership Project. "Design Considerations for COMP Joint Transmission." 3GPP TSG RAN WG1 Meeting #56bis, R1-091232, Mar. 23-27, 2009, pp. 1-9, Seoul, Korea.

3rd Generation Partnership Project. "MBMS L2 content synchronization." 3GPP TSG-RAN WG3 #55-bis, Tdoc R3-070630, Mar. 27-30, 2007, pp. 1-6, St. Julian, Malta.

Gallego, J.R. et al. "Adaptive Paging Schemes for Group Calls in Mobile Broadband Cellular Systems." 21st Annual IEEE International Symposium on Personal, Indoor and Mobile Radio Communications, Sep. 30, 2010, pp. 2444-2449.

Richards, D. et al. "Network/Content Synchronisation for MBSFN Transmission in 3GPP Networks." The 5th International Telecoms Sync Forum, ITSF 2007, Nov. 13-15, 2007, pp. 1-17, London, United Kingdom.

* cited by examiner

METHODS AND ARRANGEMENTS FOR TRANSMISSION OF PAGING IN A COMMUNICATION SYSTEM

TECHNICAL FIELD

This invention pertains in general to the field of paging, and more particularly related to the field of paging in a communication system.

BACKGROUND

A cell in a radio communication system is traditionally defined as the coverage area of the system broadcast channel. In most 3rd Generation Partnership Project (3GPP) radio communication systems, such as Global System for Mobile communication (GSM), High Speed Packet Access (HSPA), and Long Term Evolution (LTE), the coverage area of the data channels is identical to the coverage area of the broadcast channel. However, as the performance of current systems is improved with novel features supporting Coordinated Multi-Point transmission and reception (COMP), multi-carrier, and multi-hop, the coupling between system information coverage and data coverage becomes increasingly unmotivated. As will be described below there are several problems associated with this coupling.

Support for Self Optimizing Networks is Limited

If we want to automatically optimize system parameters that affect the coverage, e.g. antenna tilt, antenna beam-width, antenna pointing direction, base station transmission power, etc. then we will always risk that coverage is lost in some locations in the network. The only way we can observe this coverage loss is if customers call in and report to their operator that their service no longer works. The operators typically do not accept this and therefore, antenna and power parameters are planned when the system is deployed and are then left unchanged. The fear of breaking something that works is a show-stopper for many automatic network optimization algorithms. As a consequence most systems operate with sub-optimal settings, which is a problem.

Energy is Wasted in the Network

Now with the introduction of LTE Release-10, we have designed a system capable of achieving 1 Gbps data throughput. Future LTE releases are expected to provide even higher bitrates and even better system capacity. While there is a commercial drive for higher data transmission rates and higher capacity, there is no need at all to transmit more system information because of that. When we need to increase the capacity in an area then we need to add more cells and as a result the system information channels become over-dimensioned. If an area already has sufficient coverage for system information channels then there is no need for the new cells in that area to transmit any system information at all. In current systems, where every antenna and every carrier in the network has to be observable all the time, most of the energy consumed in the network is spent transmitting system overhead.

Support for Advanced Antenna Techniques Becomes Limited

Traditional beam-forming, where the antenna radiation pattern is adjusted towards a single UE, does not work if that implies that the coverage area of the broadcast channel is affected. In LTE Rel-8 user specific beam-forming is supported to some extent by means of using different pre-coding weights for data and broadcast signals. However we can not adjust the individual antenna elements such that energy is concentrated towards where a user is located since that would also affect the coverage of the broadcast channel.

High Interference Also During Low Load Limits Performance

Since each cell need to continuously transmit system information and mobility measurement signals (i.e. the primary common pilot channel, P-CPICH, in WCDMA and cell specific reference symbols, CRS, in LTE) we will always have a minimum amount of interference in the system. This non-traffic data related source of interference, sometimes known as pilot pollution, significantly limit the system performance during times of low traffic. Without pilot pollution the peak rates, especially during low traffic hours, would be significantly increased.

In order for the mobile stations to perform coherent demodulation of downlink data they need a reference signal as a demodulation reference. The reference signal must be transmitted in an identical way as the data to be demodulated. Hence in case we want to transmit broadcast information in a large area covering several network nodes then we must also transmit the demodulation reference signal over exactly the same large area.

In systems where the BCH is cell specific each cell also has its own demodulation reference signal and this problem does not occur. The idle UEs camps on one cell in a location area and listens to paging messages from that cell. The paging message is demodulated by using the same cell specific demodulation reference signals that is used for demodulation the BCH transmission.

However, when there is little or no relation between the coverage of a BCH Area defined as the coverage area of the system broadcast channel and the coverage area that can be provided by a single network node then we will have problems with basic system functions such as paging and random access responses.

The paging problem can be described in the following. The system wants to send a paging message to a mobile station and we assume that the network has some a-priori information on the location of the mobile station within the BCH area. Assume that the network knows, or has reason to believe, that the mobile station is in the coverage area of $RBS_1$ or $RBS_2$. Then there is no need to transmit the paging message in the whole BCH area. That would limit the possible size of the BCH area to a rather small number of participating nodes, it would require more physical resources to be spent on transmitting paging messages, and it would reduce the possibilities for cell DTX since there will be paging messages to transmit much more often in any particular node.

There is thus a need to overcome the prior art disadvantages.

SUMMARY

According to a first aspect of the present invention, a method in a first radio network node for communicating radio connection establishment information using Orthogonal Frequency Division Multiplexing, OFDM within a radio network, is provided. The method comprises receiving paging command information related to a UE from a paging controller node, wherein said paging command information comprises a list of radio network nodes. The method also comprises obtaining information about available physical radio resources of a second radio network node, for paging, and comprises determining physical radio resources to be used for transmitting a paging command for the UE. In addition, the method comprises transmitting information related to a paging command for the UE, to said second radio network node.

The list of radio network nodes in the step of receiving paging command information, may represents an estimate of UE location.

The method in a first radio network node may further comprise sending a request for information about available physical resources for paging by the second radio network node. The step obtaining information about available physical radio resources, may comprises receiving a response to the step of sending a request for information, said response comprising information about the available physical resources for paging by said second radio network node.

The step of determining physical radio resources may comprises determining one and the same paging channel for the first and second radio network nodes.

The step of determining physical radio resources may comprises determining one and the same downlink, DL demodulation reference signal for the first and second radio network nodes.

The method in a first radio network node may further comprise transmitting a paging command to the UE, wherein the transmission of the paging command is synchronized in time with the second radio network node transmitting the same paging command using the same physical radio resource using the same DL demodulation reference signal.

The step of transmitting a paging command may comprise transmitting a paging command to said UE by using a Multicast Broadcast Single Frequency Network, MBSFN radio transmission format.

The step of sending a request for information about available physical resources for paging by the second radio network node, and the step of receiving a response to the step of sending a request for information may be sent over an X2 interface.

The first radio network node and the second radio network node may comprise the first and second Radio Base Stations, RBSs, respectively, within the method in a first radio network node.

The method in a first radio network node may comprise obtaining information about available physical radio resources by a third radio network node.

The step of determining physical radio resources may comprise determining one and the same paging channel for the second and third radio network nodes.

The step of determining physical radio resources may comprise determining one and the same downlink, DL demodulation reference signal for the second and third radio network nodes.

The step of transmitting information related to a paging command may comprise transmitting information related to a paging command for the UE, to said third radio network node.

The first radio network node may be a radio network paging controller node, and the second and third radio network nodes may be a first and a second Radio Base Station, RBS, respectively.

According to a second aspect of the present invention, a radio network node for communicating radio connection establishment information using Orthogonal Frequency Division Multiplexing, OFDM within a radio network is provided, in which the radio network node may comprise means for performing the method according to the first aspect of the present invention.

Embodiments of the invention enable that paging messages may be transmitted from a smaller area than the whole BCH area. This reduces inter-cell interference, increases the amount of time that the network nodes may be in sleep mode, and it enables re-use of resources assigned for paging within the BCH area

BRIEF DESCRIPTION OF DRAWINGS

These and other aspects, features and advantages of which the invention is capable of, will be apparent and elucidated from the following description of embodiments of the present invention, reference being made to the accompanying drawings, in which.

ABBREVIATIONS

3GPP 3rd Generation Partnership Project
BCH Broadcast Channel
CoMP Coordinated Multi-Point transmission and reception
eNB Evolved NodeB
Gbps Giga bit per second
GSM Global System for Mobile Communications
HSPA High Speed Packet Access
LTE Long Term Evolution
MBSFN Multicast Broadcast Single Frequency Network
OFDM Orthogonal Frequency Division Multiplexing
RA Random Access
RACH RA Channel
RBS Radio Base Station
UE User Equipment

DETAILED DESCRIPTION

A large BCH Area (BA) reduces the need for spending resources on transmission of system information. At the same time, a large BA causes problems with paging. In order to contact an idle-mode mobile station the system need to send a paging message on a paging channel. When a BA has the size of a single cell, as in traditional systems, then we simply decide in which cells that a paging message shall be transmitted. But if the BA consists of several cooperating network nodes then we may not want to use all of them for transmitting a paging message. A term paging area can be defined as the coverage area of the network nodes that participate in transmission of a paging message. A paging area can typically be smaller than a BCH area. The assumption is that the network has decided which node or nodes to be included in the paging area.

In the case of paging, the paging area is determined by a paging algorithm, selecting nodes where it is probable that the mobile resides, and than the paging area may be extended if no paging response has been received.

Typically, paging messages need not to be transmitted over the whole BCH area. One possible way of solving this is to define a few resource regions with corresponding demodulation reference signals in the time/frequency/code space.

The embodiments of the present invention relate to coordination of paging commands.

Figure 1:
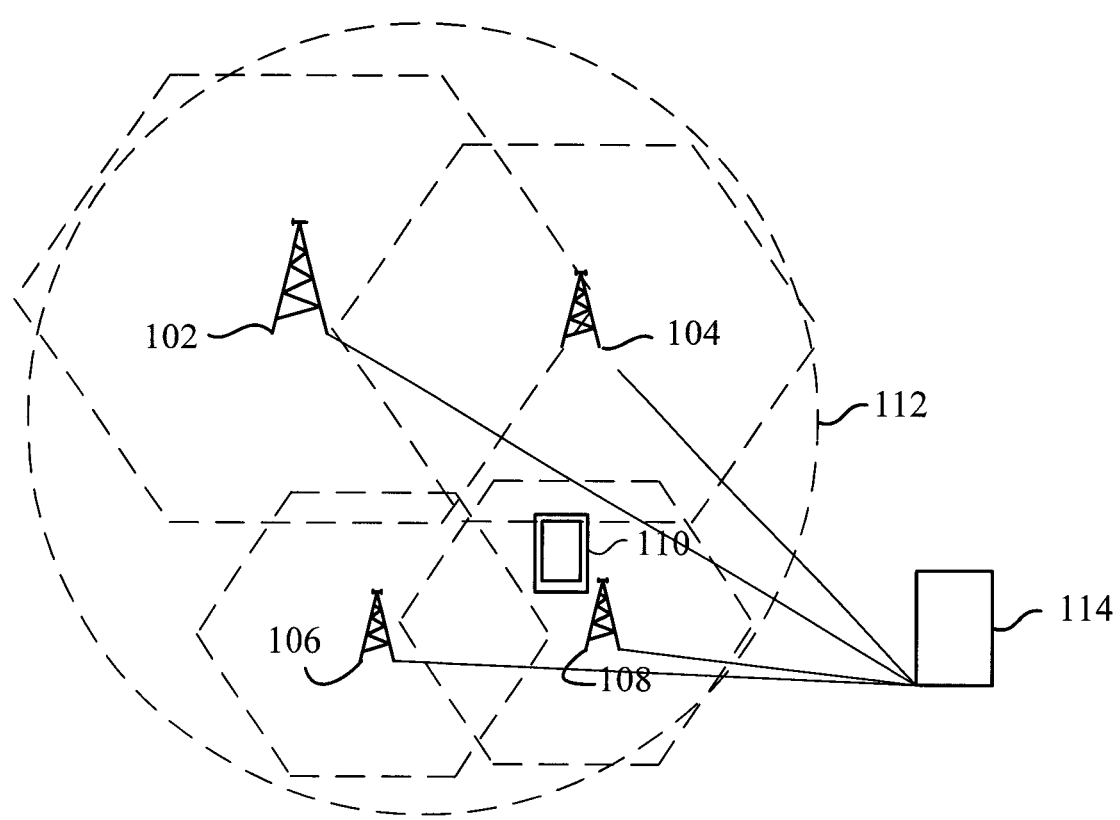
FIG. 1 illustrates a communication system, related to the present invention.

FIG. 1 schematically illustrates a communication system comprising a plurality of Radio Base Stations (RBSs) 102, 104, 106, 108 and a User Equipment 110. The communication system may also comprise a radio network paging controller node 114, which radio network paging controller node is connected to the plurality of RBSs. A Broadcast Channel Area 112 is indicated as a circle in FIG. 1. Also, coverage areas of said RBSs are indicated as hexagons drawn in broken lines.

Paging coordination may be performed in two separate modes, one being a distributed mode, and the other being a centralized mode.

Figure 2:
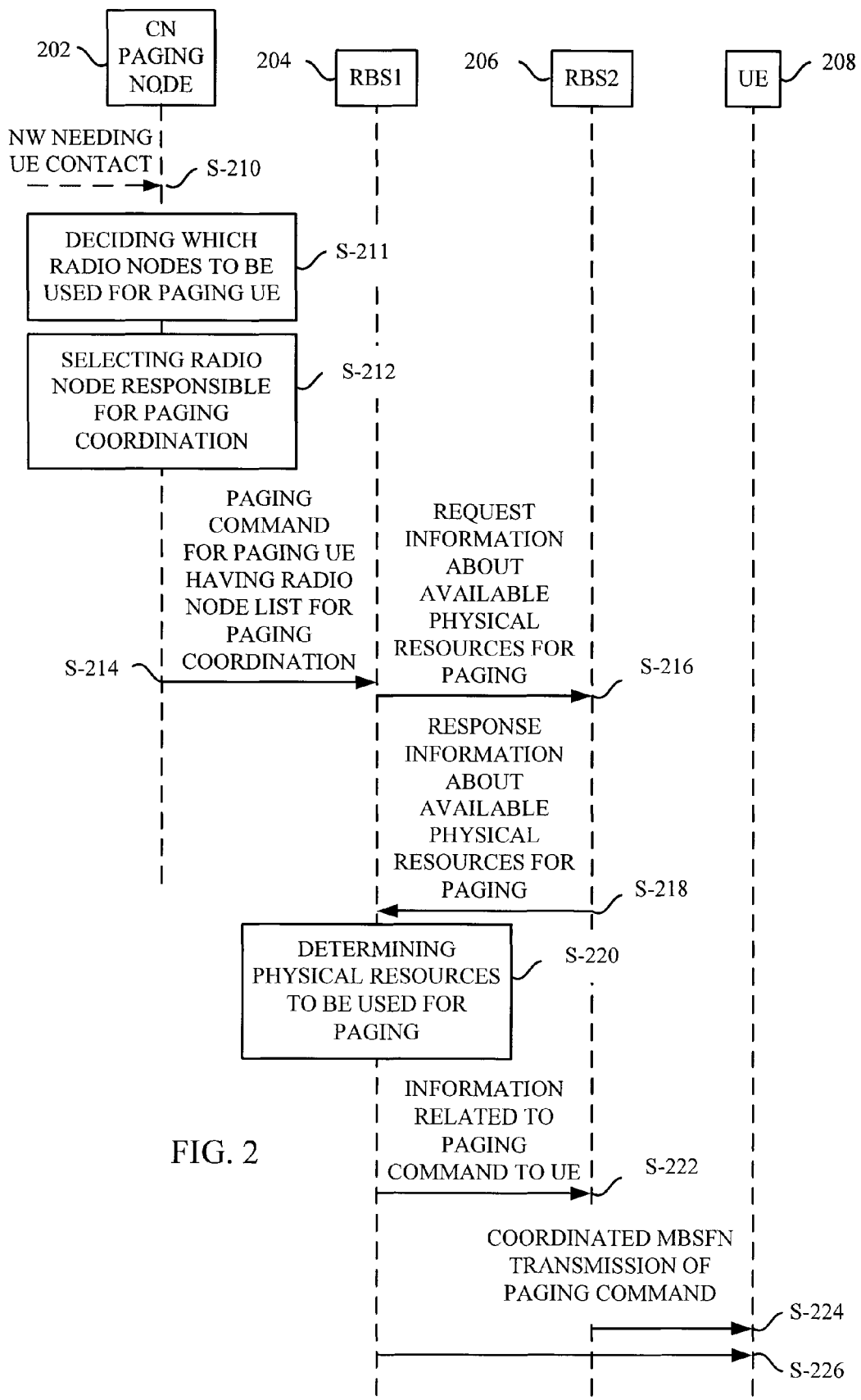
FIGS. 2 and 3 schematically illustrate signaling flow charts according to some embodiments of the present invention.

With reference to FIG. 2, illustrating a schematic signaling diagram, embodiments of a distributed mode of paging coordination is described.

Signaling is communicated between a Core Network (CN) paging node 202, a first radio Base Station, RBS 204, a second RBS 206 and a User Equipment 208.

In step S-210 the CN receives a message indicating that a Network (NW) needs contact with the UE 208. In step S-211 the CN paging node decides which radio network nodes are to be used for paging. This decision may be based on the latest known location of the UE 208, which typically can be a good estimate of the current location of the UE. Further the CN paging node then performs selecting a radio network node to be responsible for paging coordination, in step S-212.

The CN paging controller then transmits a paging command for paging the UE 208 to a radio network node, as represented by the first RBS 204. The paging command comprises a node list for paging coordination, as illustrated in step S-214. The list represents the possible radio nodes used for paging of the UE and may reflect an estimate of the location of the UE, possibly based on the latest known position of the UE.

Figure 3:
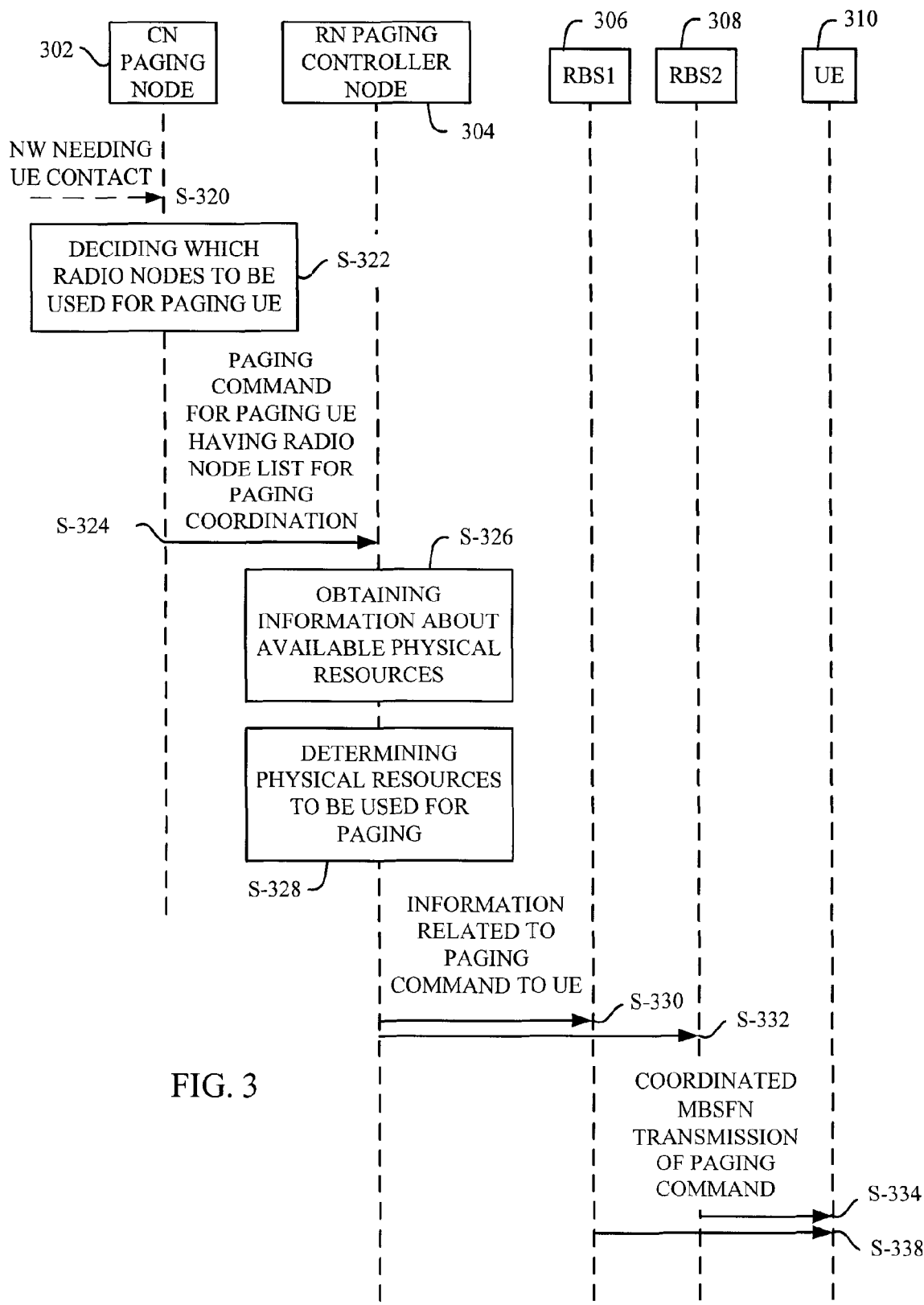

Studying the centralized mode of paging coordination, reference is mad to FIG. 3 illustrating a signaling flow diagram of communication between a Core Network paging node 302, a radio Network controller node 304, a first Radio Base Station (RBS) 306 and a second RBS 308 and a UE 310. The first two steps of paging coordination of the centralized mode are same or similar to first two steps of the distributed mode, as illustrated in FIG. 2. The CN paging node receives information that the NW needs to contact UE, in step S-320. Thereafter, the CN paging node decides which radio nodes to be used for paging the UE 310.

The next step of the centralized mode comprises sending a paging command for paging of the UE 310 to a radio network node that can be represented by the Radio Network paging controller node 304.

With reference to FIGS. 2 and 3, a method in the radio network node, denoted the first radio network node, 204, 304 for communicating radio connection establishment information using Orthogonal Frequency Division Multiplexing, (OFDM) within a radio network, is now discussed. The method comprises receiving paging command information, as illustrated in steps S-214, S-324, related to a UE 208, 310 from a paging controller node 202, 302, wherein said paging command information comprises a list of radio network nodes. The method then comprises obtaining information about available physical radio resources, as illustrated in steps S-218, S-326, of a second radio network node 206, 306, for paging. Having obtained such information, the radio network node determines physical radio resources to be used for transmitting a paging command for the UE, as illustrated in steps S-220, S-328. Then the radio network node transmits information related to a paging command for the UE, to said second radio network node, as illustrated in steps S-222, S-330, S-332.

In the distributed mode, with reference to FIG. 2, the radio network node being represented by the first RBS 204 transmits a request for information about available physical resources for paging, in step S-216. The step of obtaining information about available physical resources then comprises receiving response information about available physical resources for paging from the second RBS 206. The step of determining the physical resources is thus based on information from both the first and the second RBS. Having determined the physical resources based on resources that were available for both the first and the second RBS, the first RBS 204 now sends information, to the second RBS 206, related to a paging command to the UE 208.

Having sent such paging command information, the first RBS 204 can transmit a paging command to the UE 208, coordinated and synchronized with a paging command sent by the second RBS 206 using the same physical resources using the same paging channel and sent by using a long cyclic prefix enabling detecting the sent dual paging commands by the first RBS 204 and the second RBS 206 by the UE 208.

The paging command as sent in steps S-224 and S-226 are using coordinated Multimedia Broadcast Single Frequency Network (MBSFN) transmission.

With reference to the centralized mode of paging coordination, the step of obtaining information about available physical radio resources of a second radio network node, for paging, are obtained by the Radio Network (RN) Paging controller node 304, which controls the physical resources for paging.

The physical resources may be rescheduled by the RN paging controller node, such that available physical resources are obtained for the first and the second RBS.

The step of determining the physical resources in step S-330 is thus performed by the RN paging controller node that controls the physical resources for paging. Having determined the physical resources for paging the RN paging controller node then sends information to the first and the second RBS, related to paging command to the UE 310. Based on the received paging commands the first and the second RBS performs a coordinated and synchronized MBSFN transmission of paging commands based on controlled resources. This transmission of the two commands uses the same physical resources on the same paging channel by using the same set of DL demodulation reference signals. Further the paging commands are sent with a long cyclic prefix to the UE.

The UE can be sleeping before a paging interval is reached. In case there are uncoded candidate paging channels available, the UE identifies the DL reference signal used, determines the attenuation and distortion of the signal, demodulates the data on the same candidate paging channel, after which the information is decoded to determine whether the a paging command is detected or not. If so, the UE can continue the random access procedure of connecting to the RBS.

Figure 4:
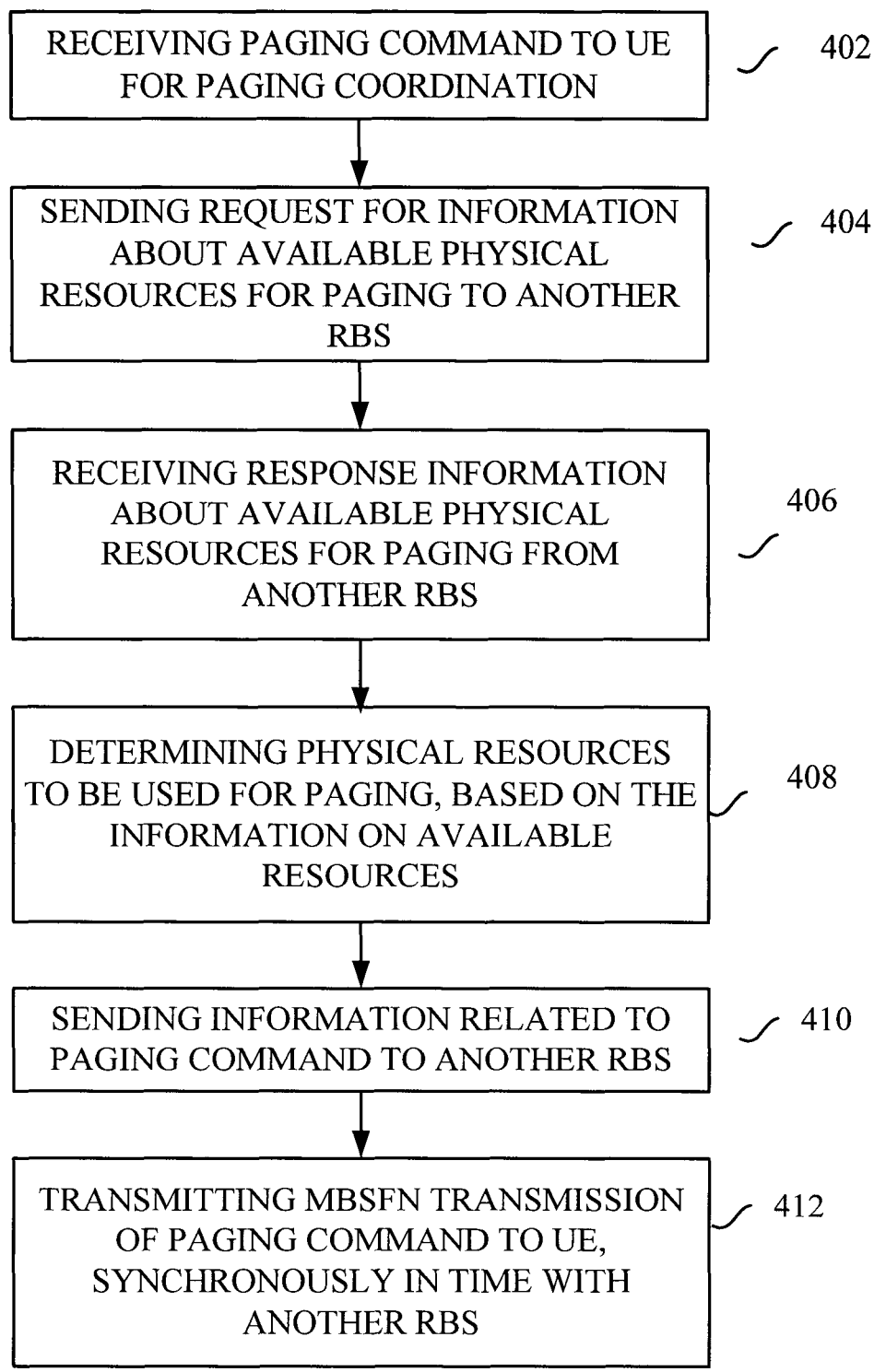
FIGS. 4 and 5 schematically illustrate flow-charts of method steps according to embodiments of the present invention.
Figure 5:
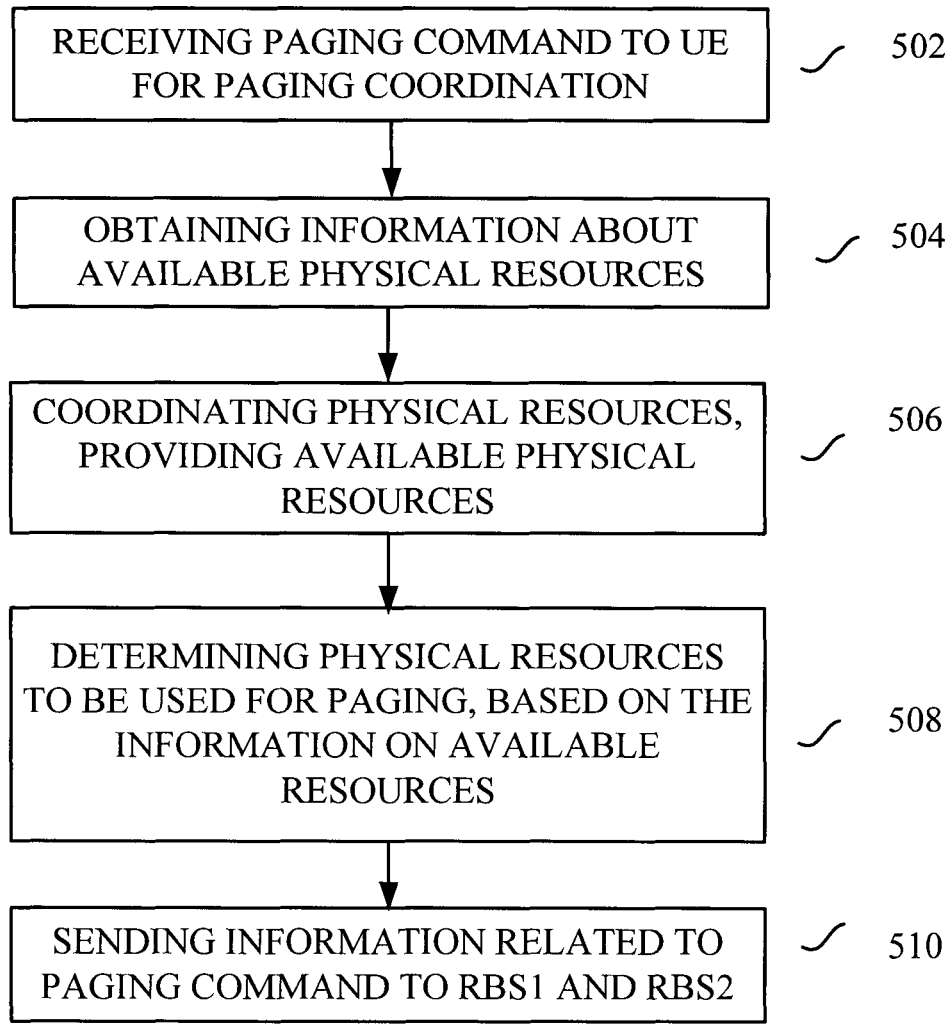

In FIGS. 4 and 5, method steps of the first RBS 204 and the RN paging controller node 304, respectively, are illustrated. Both methods starts by receiving a paging command to a UE for paging coordination, illustrated in steps 402, 502.

In the first RBS 204, the next step is sending a request for information about available physical resources for paging to another RBS, as illustrated in step 404. Thereafter, the first RBS 204 receives response information about available physical resources for paging from said another RBS, in step 406. Based on the information on available physical resources the first RBS 204 determined physical resources to be used for paging, in step 408. In step 410 the first RBS 204 sends information related to a paging command to said another RBS, being the second RBS 206. The first RBS 204 then performs MBSFN transmission of paging command to the UE, synchronously in time with said second RBS 206.

In FIG. 5, the radio network node is represented by the RN paging controller node 304, which obtains information about available physical resources, in step 504. The RN paging controller node coordinates physical resources of Radio Base Stations under control, and provides available physical resources, as illustrated in step 506. Thereafter the paging controller node determines the physical resources to be used for paging, based on the information on available physical resources. The paging controller node then sends information related to the paging command to the first 306 and the second RBS 308. This transmission of paging information, enables the synchronized paging command transmission by the first 306 and second RBS 308 to the UE.

The embodiments of the present invention have the following advantages. Embodiments of the invention enable that paging messages may be transmitted from a smaller area than the whole BCH area. This reduces inter-cell interference, increases the amount of time that the network nodes may be in sleep mode, and it enables re-use of resources assigned for paging within the BCH area It must be emphasized that the present invention can be varied in many ways. The elements of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

It is made clear that presented embodiments may well be combined forming new embodiments not explicitly described herein.

In the claims, the term "comprises/comprising" does not exclude the presence of other elements or steps. Additionally, although individual features may be included in separate claims, these may be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

Although the present invention has been described above with reference to (a) specific embodiment(s), it is not intended to be limited to the specific form set forth herein. Rather, the invention is limited only by the accompanying claims and, other embodiments than the specific above are equally possible within the scope of these appended claims.

The invention claimed is:

1. A method in a first radio network node for communicating radio connection establishment information using Orthogonal Frequency Division Multiplexing (OFDM) within a radio network, the method comprising:
    receiving paging command information related to a user equipment (UE) from a paging controller node, wherein said paging command information comprises a list of radio network nodes;
    obtaining information about physical radio resources of a second radio network node available for paging;
    determining physical radio resources, based on the information about available physical resources, to be used for transmitting a paging command for the UE; and
    transmitting information related to the paging command for the UE to said second radio network node.

2. The method in a first radio network node according to claim 1, wherein the list of radio network nodes in the step of receiving paging command information represents an estimate of UE location.

3. The method in a first radio network node according to claim 1, further comprising sending a request for information about available physical resources for paging by the second radio network node, and wherein the step of obtaining information about available physical radio resources comprises receiving a response to the step of sending a request for information, said response comprising information about the available physical resources for paging by said second radio network node.

4. The method in a first radio network node according to claim 3, wherein the step of sending a request for information about available physical resources for paging by the second radio network node, and the step of receiving a response to the step of sending a request for information, are sent over an X2 interface.

5. The method in a first radio network node according to claim 1, wherein the step of determining physical radio resources comprises determining one and the same paging channel for the first and second radio network nodes.

6. The method in a first radio network node according to claim 1, wherein the step of determining physical radio resources comprises determining one and the same downlink (DL) demodulation reference signal for the first and second radio network nodes.

7. The method in a first radio network node according to claim 6, further comprising transmitting a paging command to the UE, wherein the transmission of the paging command is synchronized in time with the second radio network node transmitting the same paging command using the same physical radio resource using the same DL demodulation reference signal.

8. The method in a first radio network node according to claim 7, wherein the step of transmitting a paging command comprises transmitting a paging command to said UE by using a Multicast Broadcast Single Frequency Network (MBSFN) radio transmission format.

9. The method in a first radio network node according to claim 1, for which the first and second radio network nodes comprise the first and second Radio Base Stations (RBSs) respectively.

10. The method in a first radio network node according to claim 1, further comprising obtaining information about available physical radio resources by a third radio network node.

11. The method in a first radio network node according to claim 10, wherein the step of determining physical radio resources comprises determining one and the same paging channel for the second and third radio network nodes.

12. The method in a first radio network node according to claim 10, wherein the step of determining physical radio resources comprises determining one and the same downlink (DL) demodulation reference signal for the second and third radio network nodes.

13. The method in a first radio network node according to claim 10, wherein the step of transmitting information related to a paging command further comprises transmitting information related to a paging command for the UE to said third radio network node.

14. The method in a first radio network node according to claim 10, for which the first radio network node is radio network paging controller node, for which the second and third radio network nodes are a first Radio Base Station (RBS) and a second RBS, respectively.

15. A radio network node for communicating radio connection establishment information using Orthogonal Frequency Division Multiplexing (OFDM) within a radio network, wherein the radio network node is configured to:

receive paging command information related to a user equipment (UE) from a paging controller node, wherein said paging command information comprises a list of radio network nodes;
obtain information about physical radio resources of a second radio network node available for paging;
determine physical radio resources, based on the information about available physical radio resources, to be used for transmitting a paging command for the UE; and
transmit information related to the paging command for the UE to said second radio network node.

* * * * *

UNITED STATES PATENT AND TRADEMARK OFFICE
CERTIFICATE OF CORRECTION

PATENT NO. : 9,155,065 B2  
APPLICATION NO. : 13/825053  
DATED : October 6, 2015  
INVENTOR(S) : Frenger et al.

It is certified that error appears in the above-identified patent and that said Letters Patent is hereby corrected as shown below:

Title Page, in Item (56), under "OTHER PUBLICATIONS", in Column 2, Line 2, delete "Netoworking" and insert -- Networking --, therefor.

Title Page, in Item (57), under "ABSTRACT", in Column 2, Line 12, delete "510" and insert -- 510) --, therefor.

On Page 2, in Item (56), under "OTHER PUBLICATIONS", in Column 1, Line 2, delete "COMP" and insert -- CoMP --, therefor.

In the specification

In Column 1, Line 22, delete "(COMP)," and insert -- (CoMP), --, therefor.

In Column 3, Line 67, delete "BCH area" and insert -- BCH area. --, therefor.

In Column 4, Line 54, delete "and than" and insert -- and then --, therefor.

In Column 5, Line 30, delete "is mad" and insert -- is made --, therefor.

In Column 6, Line 46, delete "whether the a" and insert -- whether the --, therefor.

In Column 7, Line 17, delete "BCH area" and insert -- BCH area. --, therefor.

Signed and Sealed this  
Fifth Day of July, 2016

Michelle K. Lee  
*Director of the United States Patent and Trademark Office*